United States Patent [19]
Miller et al.

[11] Patent Number: 5,848,780
[45] Date of Patent: Dec. 15, 1998

[54] STRAIGHT FLUID FLOW SOLENOID VALVE

[75] Inventors: Jim D. Miller, Minooka; Robert J. Rudisil, Plainfield, both of Ill.

[73] Assignee: Liberty Controls, Inc., Shorewood, Ill.

[21] Appl. No.: 869,786

[22] Filed: Jun. 5, 1997

[51] Int. Cl.⁶ .................................................. F16K 31/02
[52] U.S. Cl. ............................. 251/129.21; 251/129.15
[58] Field of Search ........................ 251/129.21, 129.15, 251/129.08; 137/334, 337

[56] References Cited

U.S. PATENT DOCUMENTS

| | | | |
|---|---|---|---|
| 3,833,015 | 9/1974 | Kneuer | 251/129.21 |
| 4,575,009 | 3/1986 | Giraudi | 251/129.21 |
| 4,790,513 | 12/1988 | Davis et al. | 251/129.21 |
| 5,232,167 | 8/1993 | McCormick et al. | 251/129.21 |
| 5,277,400 | 1/1994 | Bierther | 251/129.21 |
| 5,348,224 | 9/1994 | Consadori et al. | 251/129.21 |
| 5,360,197 | 11/1994 | Reiter et al. | 251/129.21 |

*Primary Examiner*—Denise L. Ferensic
*Assistant Examiner*—John Ball
*Attorney, Agent, or Firm*—Cherskov & Flaynik

[57] ABSTRACT

A straight fluid flow solenoid valve 10 comprising a conduit 24 having an inlet 148, an outlet 146 and a seat 88 member therein with an aperture 90 therethrough; a plunger 68, backstop 76 and spring 70 positioned inside the conduit 24 such that when a voltage is impressed upon a coil 22 circumferentially positioned around the exterior of the conduit 24, the plunger 68 is moved from a closed position to an open position thereby allowing a fluid to pass through the solenoid valve 10 in a substantially laminar flow stream while engaging the plunger 68 and the backstop 76.

14 Claims, 12 Drawing Sheets

STRAIGHT FLUID FLOW SOLENOID VALVE

BACKGROUND OF THE INVENTION

1. Field of the Invention

The present invention relates to a solenoid valve and more particularly, to a straight fluid flow solenoid valve that allows a fluid to flow therethrough in a substantiality laminar stream.

2. Background of the Prior Art

Solenoid valves are utilized in a variety of applications including flow control and on-off operations for both gas and liquids. Solenoid valves operate by utilizing an electromagnetic coil wrapped around a plunger that is integrally secured to a valve via a valve stem.

Prior art solenoid valves utilize a valve body that includes a planar valve seating surface with an orifice therethrough, and a valve that is received by the seating surface. The planar seating surface is orientated in a position that has the planar surface parallel to the direction of fluid flow. Thus, the fluid flow must change direction by ninety degrees in order for the flow to pass through the orifice in the planar seating surface. Further, once passing through the orifice, the fluid flow is then shifted another ninety degrees, thereby changing the fluid flow direction back to its original line of flow, that being parallel to the planar seating surface.

In operation, a fluid flow stream enters a solenoid valve body via an inlet port, the flow stream being guided through an orifice then exiting the valve body via an outlet port. The direction of the fluid flow into the inlet port and out of the outlet port remains the same. However, the fluid flow direction within the valve body and more specifically, through the orifice in the planar seating surface, changes twice, ninety degrees before passing through the orifice and ninety degrees after passing through the orifice, thereby directing the fluid flow into substantially an "S" configuration. The two ninety degree changes in fluid flow direction causes turbulence and friction that consequently create a pressure drop across the orifice in the planar seating surface that inherently restricts flow. This flow restriction requires the sizing of a solenoid valve with a larger body, larger inlet and outlet parts, a larger planar valve seat and a larger orifice to allow the required fluid flow to pass therethrough. The increased size of the solenoid valve causes a corresponding increase in material and labor cost.

Examples of solenoid valve designs that shift fluid flow directions as detailed above are illustrated in U.S. Pat. Nos. 4,978,101; 4,928,111; 4,638,973; 4,245,815; 25 4,133,348; and 3,698,682.

Therefore, a solenoid valve design is required that does not change fluid flow direction thereby reducing friction and pressure drop parameters across the orifice of the planar seating surface. Further, the solenoid valve design should include features that have no blunt flow impediments that would decrease laminar flow, increase turbulent flow and correspondingly increase pressure drop.

SUMMARY OF THE INVENTION

It is an object of the present invention to overcome many of the disadvantages associated with solenoid valves. Other objects are to reduce the number of components to build a solenoid valve; to reduce the costs to manufacture a solenoid valve; to provide a solenoid valve that does not change the direction of fluid flow therethrough; to reduce the pressure drops across a solenoid valve; to reduce turbulent fluid flow and increase laminar fluid flow through a solenoid valve; to reduce friction between a solenoid valve and a fluid flow passing therethrough.

The present invention provides a straight fluid flow solenoid valve comprising a substantially linear conduit having an inlet and outlet; a seat having an aperture to allow a fluid flow to pass therethrough, said seat being secured in a first portion of said conduit; a backstop secured in a second portion of said conduit, said backstop including means for allowing a fluid flow to pass adjacent thereto; a plunger positioned in said conduit between said seat and said backstop, said plunger including means for preventing a fluid flow through said seat aperture when first predetermined conditions are satisfied, and means for allowing a fluid flow to pass adjacent thereto when second predetermined conditions are satisfied; means for moving said plunger from a first position to a second position thereby forcibly engaging said plunger against said backstop to allow fluid flow through said aperture; and means for returning said plunger from said second position to said first position thereby forcibly engaging said plunger against said seat to prevent fluid flow through said seat aperture.

BRIEF DESCRIPTION OF THE DRAWINGS

These and other objects, advantages and novel features of the present invention, as well as details of an illustrative embodiment thereof, will be more fully understood from the following detailed description and attached drawings, wherein.

DETAILED DESCRIPTION OF THE PREFERRED EMBODIMENT

Figure 1:
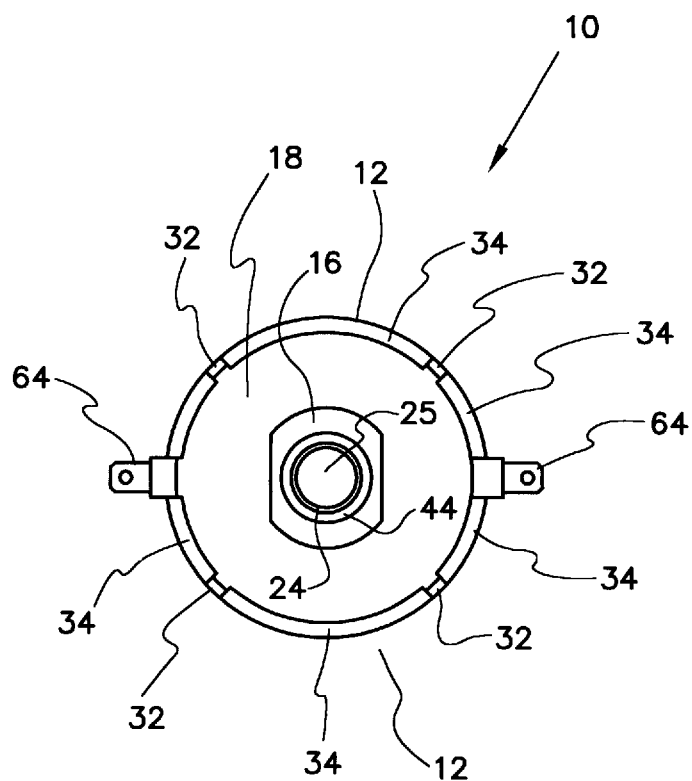
FIG. 1 is a side elevation view of a straight fluid flow solenoid valve in accordance with the present invention.
Figure 2:
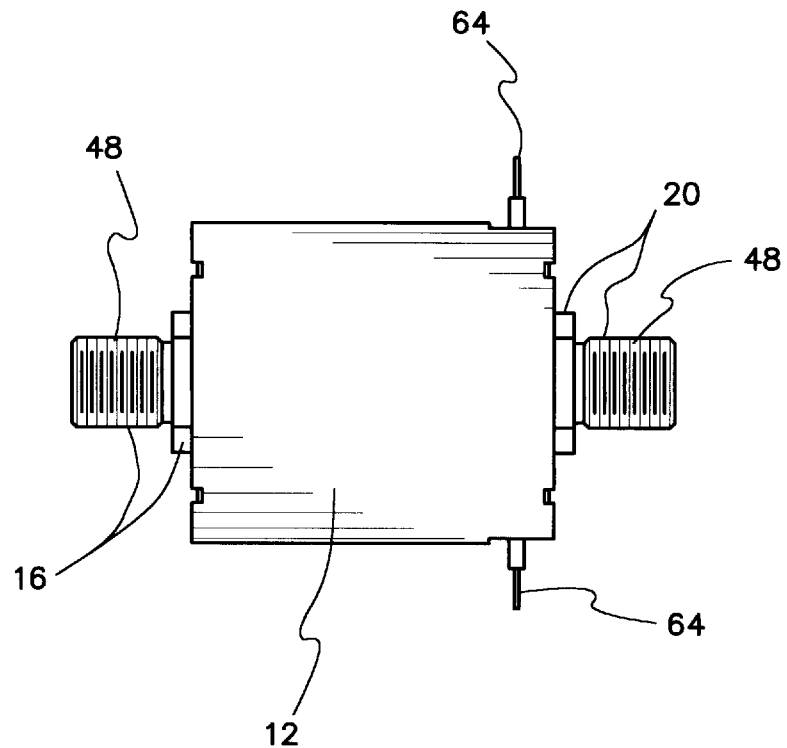
FIG. 2 is a front elevation view of a straight fluid flow solenoid valve in accordance with the present invention.
Figure 3:
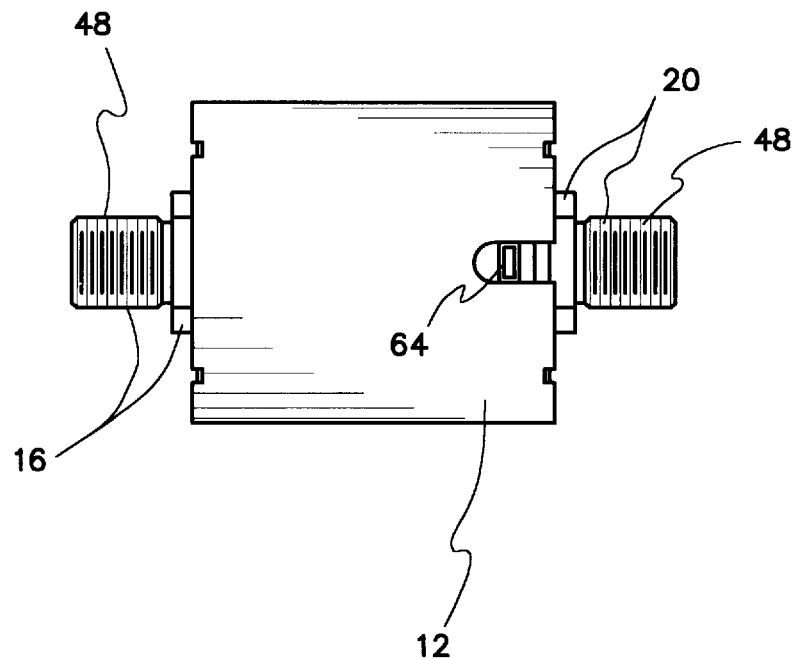
FIG. 3 is a top elevation view of a straight fluid flow solenoid valve in accordance with the present invention.

Referring now to the figures and in particular to FIGS. 1–3, a straight fluid flow solenoid valve in accordance with this invention is denoted by numeral 10. The solenoid valve 10 includes a housing frame 12, a back plate 14, a back mounting collar 16, a front plate 18, a front mounting collar 20, a coil assembly 22 and a fluid flow conduit 24 that provides a flow passage 25. The flow passage 25 is linear in design thereby avoiding a pressure drop that would otherwise occur should a bend or other "non-straight" flow characteristic be utilized in the engineering of the solenoid valve 10. It is well known in the art that bends in a fluid flow cause a corresponding pressure drop that inherently reduces the fluid flow quantity per unit of time (flow rate). Therefore, when calculating the size of a pipe or other conduit that contains a required fluid flow rate, a larger pipe will be utilized than otherwise would be required for a preselected flow rate when an excess quantity of pipe bends is encountered.

Figure 4:
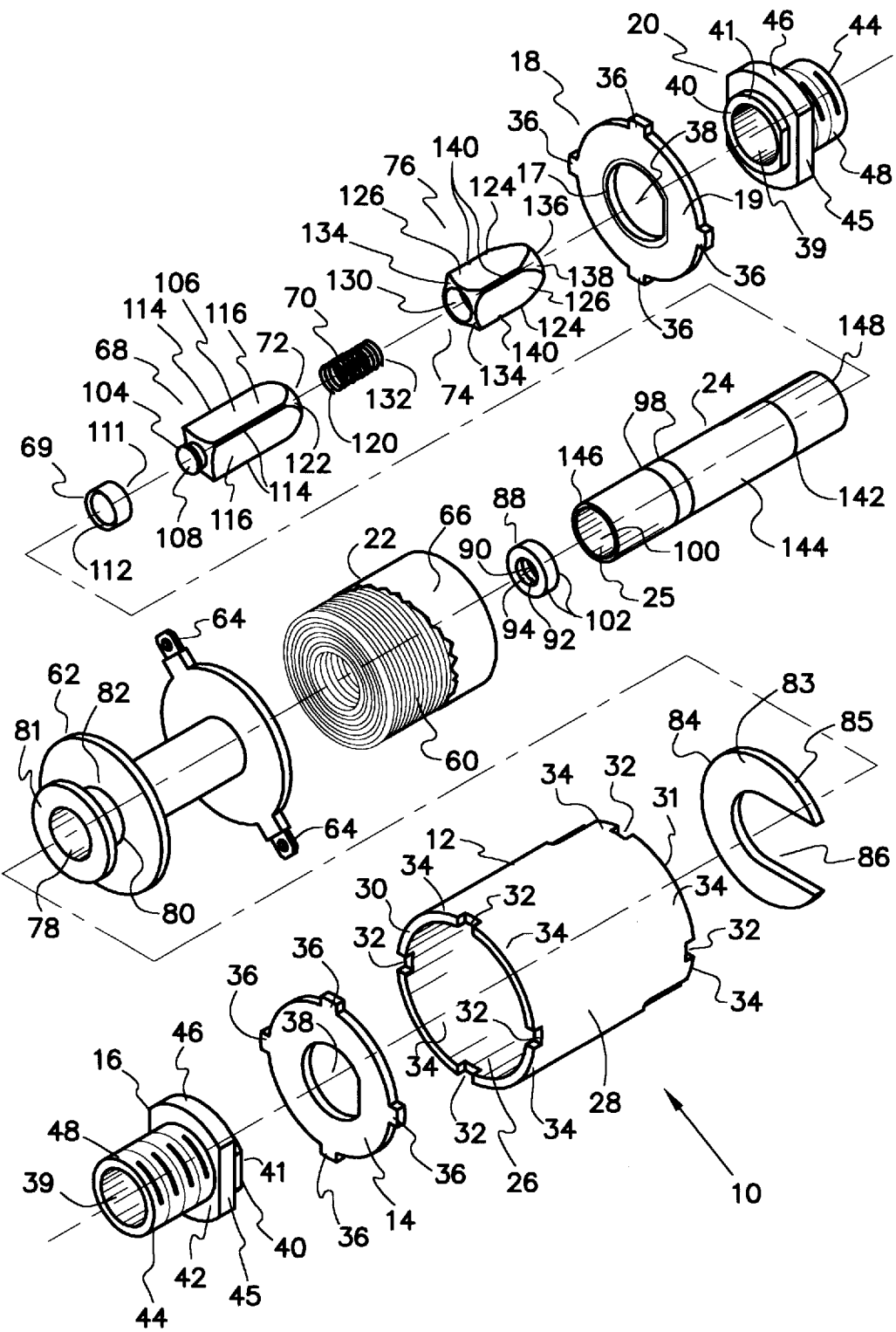
FIG. 4 is an exploded perspective view of a straight fluid flow solenoid valve in accordance with the present invention.

Referring to FIG. 4, an exploded perspective view of a straight fluid flow solenoid valve in accordance with this invention is shown. The housing frame 12 is cylindrically shaped with inner and outer wall 26 and 28 having dimensions selected to form front and back edges 30 and 31 each approximately one-eighth inch thick. The frame 12 is fabricated from a ferro-magnetic material, an exemplary type being C1010, a general classification of low carbon steel. The frame 12 includes four equally spaced bending recesses 32 on each edge 30 and 31. The bending recesses 32 are sized to allow a retaining portion 34 of the frame 12 to bend inward a distance sufficient to retain the back and front plates 14 and 18 at an assembled position.

The back and front plates 14 and 18 are washer configured portions of metal having substantially the same dimensions. Both plates 14 and 18 include an orifice 38 and four mounting slots 36 positioned to insert in bending recesses 32 thereby rigidly securing the plates 14 and 18 to the frame 12. The back plate 14 is fabricated from a non-ferrous metal such as aluminum to avoid providing a magnetic path for magnetic flux lines generated by the coil assembly 22. The front plate 18 is fabricated from a ferro-magnetic material, an exemplary type being C1010 carbon steel, to provide a magnetic path for the flux lines generated by the coil assembly 22.

The back and front mounting collars 16 and 20 are fabricated from a low carbon steel material such as 12L14 or similar ferrous metal. The mounting collars 16 and 20 have a cylindrical orifice 39 therethrough and include a plate receiving portion 40, a plate contact portion 42 and a cylindrical portion 44. When taking a side elevation view of the plate receiving portions 40 of the collars 16 and 20, the plate receiving portion 40 is a "D" configured axial extension of the contact portion 42 extending a distance from the contact portion 42 a dimension substantially equal to the axial dimension of plate 14 or plate 18.

The plates 14 and 18 are inserted onto the plate receiving portion 40. The plates 14 and 18 are then secured to the mounting collars 16 and 20 via a "staking" process, a method well known in the art whereby a portion of metal from the outer edge 41 of the plate receiving portion 40 is "squeezed" from the outer edge 41 onto an inner portion 43 of the plates 14 and 18. The "D" shaped configuration of the plate receiving portion 40 coupled with the staking process prevent the plates 14 and 18 from rotating upon the collars 16 and 20.

The contact portion 42 of the mounting collars 16 and 20 is configured to receive a tightening tool thereupon by utilizing a quassi rectangular form having opposing parallel planar sides 45 together with opposing arcuate shaped sides 46. The tightening tool contacts sides 45, rotates, causing a threaded end 48 of the cylindrical portion 44 to tighten into a provided gas line. The thread quantity and size corresponding to gas line size and pressure.

The coil assembly 22 includes windings 60 wound on bobbin 62, a pair of electrical contact terminals 64 that are connected to respective ends of the wire used to form the windings 60, and a mylar shield 66 used to cover and protect the windings 60 when inserting the coil assembly 22 into the housing frame 12. The terminals 64 extend from the coil assembly 22 and ultimately connect to a voltage source (not shown) that energizes the windings 60. The windings 60 are comprised of enamel coated No. 28.5 gauge copper wire or any other similarly conductive metallic strand wound around the bobbin 62 multiple times (at least 1750 times) to generate sufficient linear force to ultimately move a plunger 68 and seal 69 assembly against a sealing spring 70 and compressing the sealing spring 70 until a front end 72 of the plunger 68 contacts a back end 74 of a back stop 76. The required linear force will vary according to the respective size of the plunger 68 selected. Also, one would vary the wire size and the number of windings to correspond to the required linear force to move the plunger 68 until positioned adjacent to the back stop 76. Methods of determining wire size and the number of windings corresponding to required linear force are well known to one of ordinary skill in the art.

The voltage source generally would be 12 volts D.C. and the corresponding electrical current flow would be approximately 250 milliamps. However, the coil assembly 22 design may vary to operate at higher voltages. Also, the windings 60 have a thermal self-protecting feature that is accomplished by utilizing copper wire that has increasing resistance to electrical current flow as temperature increases.

The bobbin 62 is fabricated from plastic, nylon or other non-ferrous material, an exemplary type being a Zytel 30% glass fill, class B bobbin. The bobbin 62 is cyndrically shaped and includes an axial cavity 78 therethrough, a hub 80 and a flux washer retainer 81 integrally joined to a planar surface 82. The hub 80 receives a flux washer 84 thereupon via a "horseshoe" shaped recess 86 in the washer 84. The axial dimension and outer diameter of the hub 80 are sized to allow the flux washer 84 to fit snugly between the retainer 81 and the planar surface 82.

The flux washer 84 is fabricated from a ferrous material such as C1010. The purpose of the flux washer 84 is to direct the magnetic flux generated by the windings 60 from the coil assembly 22 to the frame 12 thereby completing a magnetic path enabling the solenoid valve 10 to open. The flux washer 84 has a diameter dimension equal to the diameter of the planar surface 82. Further, the flux washer 84 has two parallel, cylindrical planar sides 83 and 85 having a distance therebetween corresponding to the magnetic flux path required to provide the linear force to move the plunger 68 a predetermined distance. That distance being calculated as a function of the flow rate engineered to flow through the valve 10, the calculation being known to one having ordinary skill in the art.

The solenoid valve 10 includes a seat 88 fabricated from C1008 or C1010 low carbon steel. Alternatively, a non-ferromagnetic material could be utilized such as brass, but generally the cost for the non-ferromagnetic material is higher. The seat 88 includes an aperture 90 therethrough having a frustoconically shaped plunger receiving portion 92 that also serves as an inlet for fluid flow, and a cylindrically shaped flow outlet portion 94. The flow outlet portion 94 is calibrated pursuant to methods well known in the art to allow a predetermined flow rate to pass therethrough. The seat 88 is substantially a washer rigidly secured at a predetermined position in the fluid flow conduit 24 by two circumferential crimp rings 98 that force the inner wall 100 of the conduit 24 against the two circumferential edges 102 of the seat 88.

The plunger 68 is fabricated from a ferro-magnetic low carbon steel metal. An exemplary type being 12L14, a category well known in the industry. The plunger 68 receives a zinc dichromate yellow plating surface to resist corrosive fluids such as methane gas. The plunger 68 includes a substantially cylindrical seal retainer portion 104 that concentrically extends from the body 106 of the plunger 68 along the longitudinal axis. The seal retainer portion 104 includes a locking cap 108 and a stem 110, the cap 108 having a diameter slightly larger than the diameter of the stem 110. The seal 69 or "Poppit" is substantially a rubber cover for the locking cap 108 and stem 110. The seal 69 has a cavity 111 therein that is identical in size and configuration with the cap 108 and stem 110. The seal 69 is forcibly positioned onto the retainer 104 until the locking cap 108 secures the seal 68 upon the retainer portion 104. The seal 69 includes a sealing ridge 112 circumferentially around the perimeter of the seal 69. The seal 69 is dimensioned such that the sealing ridge 112 has an outer diameter slightly larger than the diameter of the cylindrical outlet portion 94 of the aperture 90. The ridge reduces the force that would otherwise be required to provide a tight shutoff of fluid flow when the seal 69 and the seat 88 are forcibly engaged.

Figure 7:
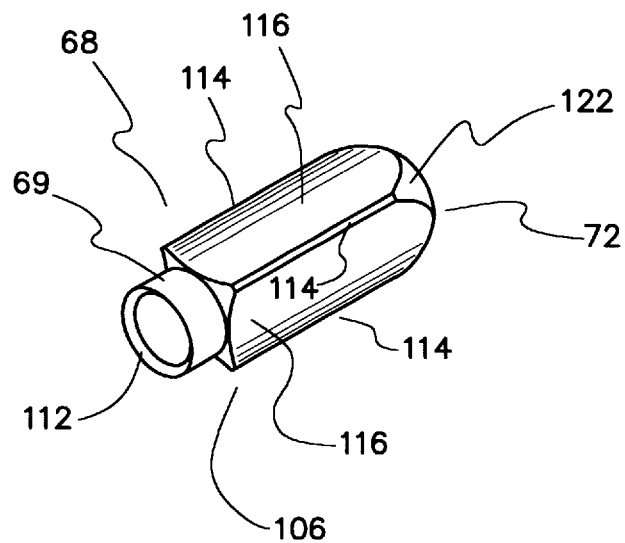
FIG. 7 is a perspective view of a plunger component of a straight fluid flow solenoid valve in accordance with the present invention.
Figure 8:
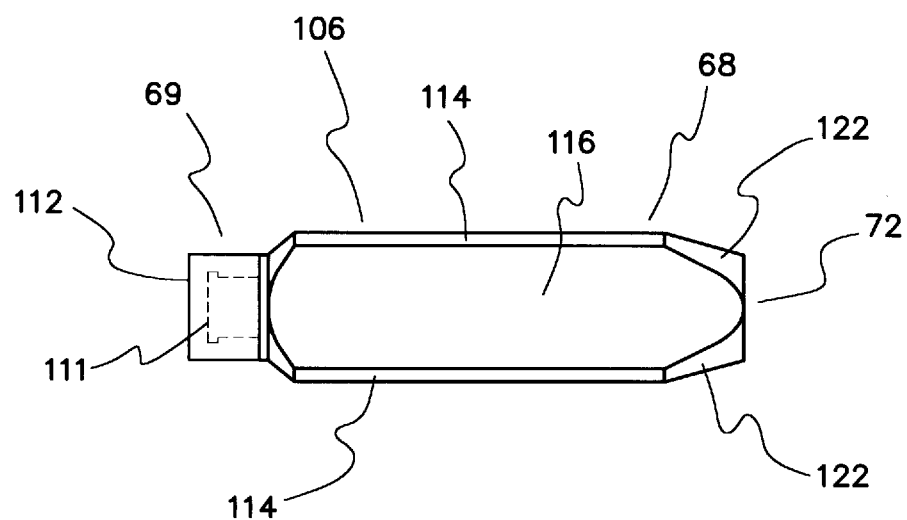
FIG. 8 is a front elevation view of the plunger depicted in FIG. 7.
Figure 9:
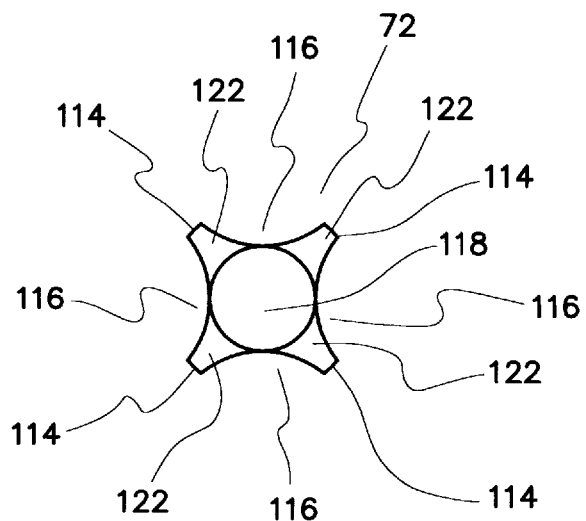
FIG. 9 is a side elevation view of the plunger depicted in FIG. 7.

Referring to Figures 7–9, perspective, front elevation, and side elevation views of the plunger 68 in accordance with the present invention are depicted. The body 106 of the plunger 68 is formed from a portion of metal having substantially a rectangular configuration when taking a front elevation view and initially a substantially square configuration when taking a side elevation view. The body 106 has a lateral diagonal dimension slightly smaller than the diameter of the inner wall 100 of the conduit 24 thereby allowing the plunger 68 to move inside the conduit when predetermined conditions require same. The body 106 has a longitudinal dimension approximately triple the lateral dimension of one of the sides of the square configuration of the body 106. The substantially larger longitudinal dimension is required to maintain stability in the movement of the plunger 68, and to enhance laminar flow of the fluid passing adjacent to the plunger 68.

Although the body 106 of the plunger 68 has initially a square configuration when taking a side view, to increase laminar flow rates of the fluid flowing adjacent to the plunger 68, four longitudinal frustoconically shaped flow vanes 114 (Fig.9) are formed by machining arcuately shaped longitudinal recesses 116 in each side of the body 106 of the plunger 68.

The configuration of the body 106 further includes a tapered or truncated "torpedo" shaped front end portion 122 of the flow vanes 114 to reduce turbulence and backpressure caused by the fluid flow impacting the front end 72 of the plunger 68. The front end portions 138 of the flow vanes 124 intersect with the plunger longitudinal axis thereby forming an acute angle between each front end portion 138 and the plunger axis. A substantially cylindrically shaped spring receiving aperture 118 is bored into the front end 72 of the plunger 68, a depth sufficient to capture and retain a back end portion 120 of the spring 70 irrespective of the longitudinal position of the plunger 68 inside the conduit 24.

Figure 10:
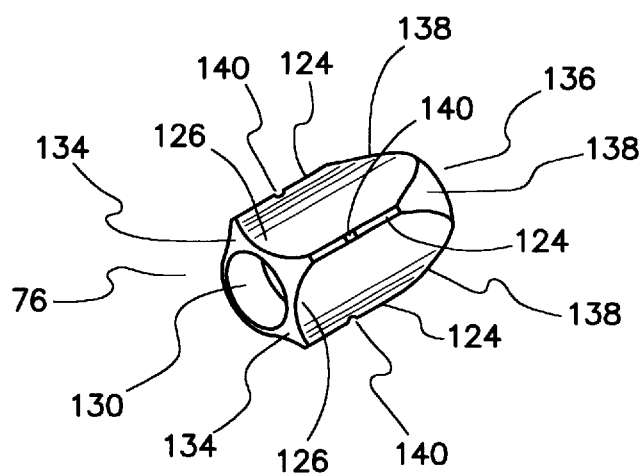
FIG. 10 is a perspective view of a backstop component of a straight fluid flow solenoid valve in accordance with the present invention.
Figure 11:
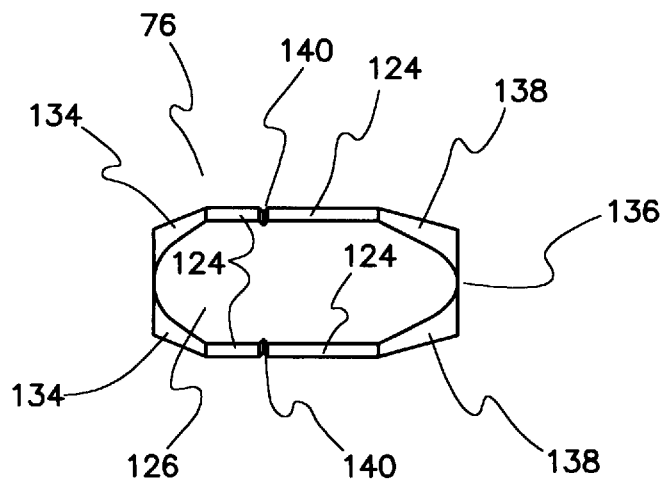
FIG. 11 is a front elevation view of the backstop depicted in FIG. 10.
Figure 12:
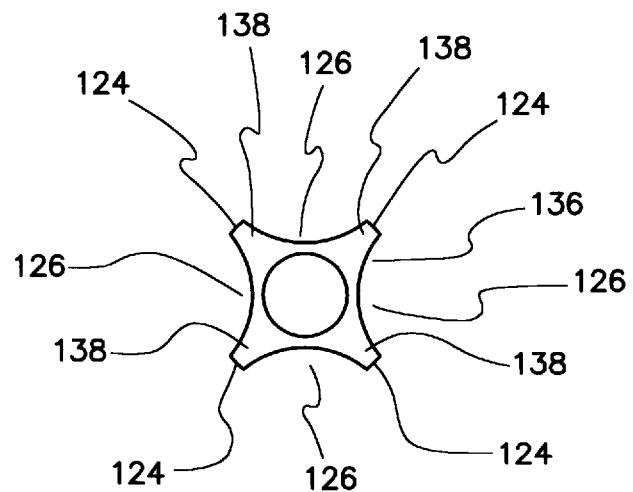
FIG. 12 is a side elevation view of the backstop depicted in FIG. 10.

Referring to FIGS. 10–12, perspective, front elevation, and side elevation views of the backstop 76 in accordance with the present invention are depicted. The backstop 76 has substantially the same configuration as the plunger 68, but with a relatively smaller longitudinal dimension. The backstop is fabricated from a ferro-magnetic low carbon steel metal such as 12L14, and receives a zinc dichromate yellow plating surface to resist corrosive fluids. The backstop 76, like the plunger 68, includes four longitudinal frustoconically shaped flow vanes 124 (FIG. 12) formed by machining arcuately shaped longitudinal recesses 126 in each side of the backstop 76.

The back end 74 of the backstop 76 includes back end portions 134 of the flow vanes 124, having substantially the same truncated "torpedo" shaped or tapered configuration as the front end portions 122 of the flow vanes 114 of the plunger 68. A substantially cylindrically shaped spring receiving aperture 130 is bored into the back end 74 of the backstop 76, a depth sufficient to capture and retain a front end portion 132 of the spring 70 irrespective of the longitudinal position of the plunger 68 inside the conduit 24.

The backstop 76 includes a front end 136 having a configuration similar to the back end 72 of the plunger 68. The front end 136 includes front end portions 138 of the flow vanes 124 having a more "severe" taper than the back end portions 130. The front end portions 138 are longer than the back end portions 134 and form a smaller acute angle with the backstop axis than do the back end portions 134. The taper of the front end portions 138 provides an increased "streamline" design to the front end 136 of the backstop 76. The design is required due to the front end 136 of the backstop 76 being the first component of the solenoid valve 10 to engage the fluid flow stream, whereupon generated backpressure and turbulence will be at a maximum. The increased "streamline" design enhances laminar flow by reducing flow restrictions thereby reducing backpressure and turbulence.

The backstop 76 further includes a slight recess 140 that circumscribes the backstop 76 across only the longitudinal flow vanes 124 providing four receiving recesses 140 for a crimp ring 142 that is formed on the outer wall 144 of the conduit 24 that correspondingly forces the inner wall 100 of the conduit 24 into each of the four recesses 140 thereby rigidly securing the position of the backstop 76 inside the conduit 24 such that the longitudinal axes of the backstop 76 and the conduit 24 are aligned. Further, one should note that although the backstop 76 is captured, the plunger 68 remains free to rotate and slide within the conduit 24. The feature of allowing the plunger 68 to move easily inside the conduit 24 is necessary for the valve 10 to operate. Should the plunger 68 rotate, resulting in the vanes of the plunger 68 and backstop 76 being out of alignment, laminar flow will be maintained due to the longitudinal dimension of the plunger flow vanes 114 and due to the longitudinal axes of the plunger 68 and the backstop 76 being nearly in alignment.

The spring 70 is fabricated from stainless steel and sized to insert into apertures 118 and 130 and remain in the apertures irrespective of the position of the plunger 68 or the fluid flow rates passing through the valve 10. The spring 70 is sized to generate enough force to return the plunger 68 to a closed position when the coil assembly 22 is de-energized irrespective of the positioning of the solenoid valve 10. An exemplary spring is manufactured by CENTURY SPRING, model # BB-37.

The fluid flow conduit 24 is cylindrically shaped, semi-rigid tubing extending longitudinally through the solenoid valve 10 a distance corresponding to the longitudinal distance required for the seat 88, plunger 60, sealing spring 70 and backstop 76 therein. Further, the conduit 24 has an inner wall 100 diameter sufficient to snugly receive the seat 88. The conduit 24 has a cylindrical outer wall 144 with a diameter slightly smaller than the diameter of the axial cavity 78 of the bobbin 62. The conduit is fabricated from brass, although other non ferro-magnetic, non corroding materials could be utilized.

The conduit 24 includes two seat ring stakes 98 utilized to capture the washer shaped seat 88 therebetween. The ring stakes 98 are slight inwardly extending ridges of the conduit inner wall 100 circumferentially formed by a machine tool that compresses inwardly the conduit outer wall 144 after the seat 88 has been prepositioned inside the conduit 24. The seat 88 is captured tight enough by the ring stakes 98 to prevent a fluid from passing between the seat 88 and ring stakes 98.

The conduit 24 further includes the backstop ring stake 142 utilized to position the back stop 76. The backstop ring stake 142 is identical to the seat ring stakes 98, and is formed the same way. The backstop ring stake 142 captures the back stop 76 and prevents the backstop 76 from moving after the backstop 76 has been inserted within the conduit 24 to a predetermined position. This is accomplished by the spring 70 maintaining a constant bias on the backstop 76, irrespective of the plunger 68 position within the conduit 24. Thus, the backstop 76 is in continuous forcible engagement with the backstop ring stake 142.

The solenoid valve 10 is assembled by first inserting a seat 88 in a back end 146 of the conduit 130, then inserting a plunger 68 and seal 69 assembly followed by a spring 70, then a back stop 76 in a front end 148 of the conduit 24. These components are then forced inwardly a precalibrated distance by utilizing tooling well known in the art. The precalibrated distance is a function of the gap 150 or longitudinal distance required between the seat 88 and the seal 69. The gap 150 is the primary component that controls the quantity of fluid flow that passes through the solenoid valve 10. For the exemplary purposes only, a gap 150 of 0.080 inches will correspond to a flow rate of 30,000 BTU'S per hour. In general terms, the seat 88 is positioned in a back end portion of the conduit 24, the plunger 68 in a mid-potion of the conduit 24 and the backstop 76 in a front end portion of the conduit 24.

Upon reaching the desired positions, a circumferential crimping tool forces the outer wall 144 of the conduit 24 inwardly thereby forming the three ring stakes in the inner wall 100. The two seat ring stakes 98 capture the seat 88 and the one backstop ring stake 142 captures the backstop 76. The captured seat 88 and backstop 76 within the conduit 24 enables the spring 70 to be compressed between the plunger 68 and the backstop 76. The conduit 24 is then forcibly inserted through the coil assembly 22 via cavity 78 such that the back and front ends 146 and 148 of the conduit 24 are protruding slightly. The hub 80 of the coil assembly 22 then receives the flux washer 84. The conduit 24, coil assembly 22 and flux washer 84 are inserted into the housing frame 12 with the terminals 64 extending unencumbered through the housing frame 12. The aluminum backplate 14 and back mounting collar 16 are positioned on the back end 146 of the conduit 130 such that a small portion of the back end 146 extends beyond the threaded end 48 of the back mounting collar 16. The ferro-magnetic front plate 18 and front mounting collar 20 are positioned on the front end 148 of the conduit 24 such that a small portion of the front end 148 extends beyond the threaded end 48 of the front mounting collar 20. The mounting stubs 36 of the back and front plates 14 and 18 are received by the bending recesses 32 in the framed 12. The retaining portions 34 of the frame 12 are then bent over onto the respective front and back plates 18 and 14 thereby securing the coil assembly 22 within the housing 12. Finally, the front and back ends 148 and 146 of the conduit 24 that extend beyond the connector fittings 52, are flared outward thereby securing the positions of the coil assembly 22, frame 12, flux washer 84, front and back plates 18 and 14, and front and back collars 20 and 16 on the outer wall 144 of the fluid flow conduit 24.

Figure 5:
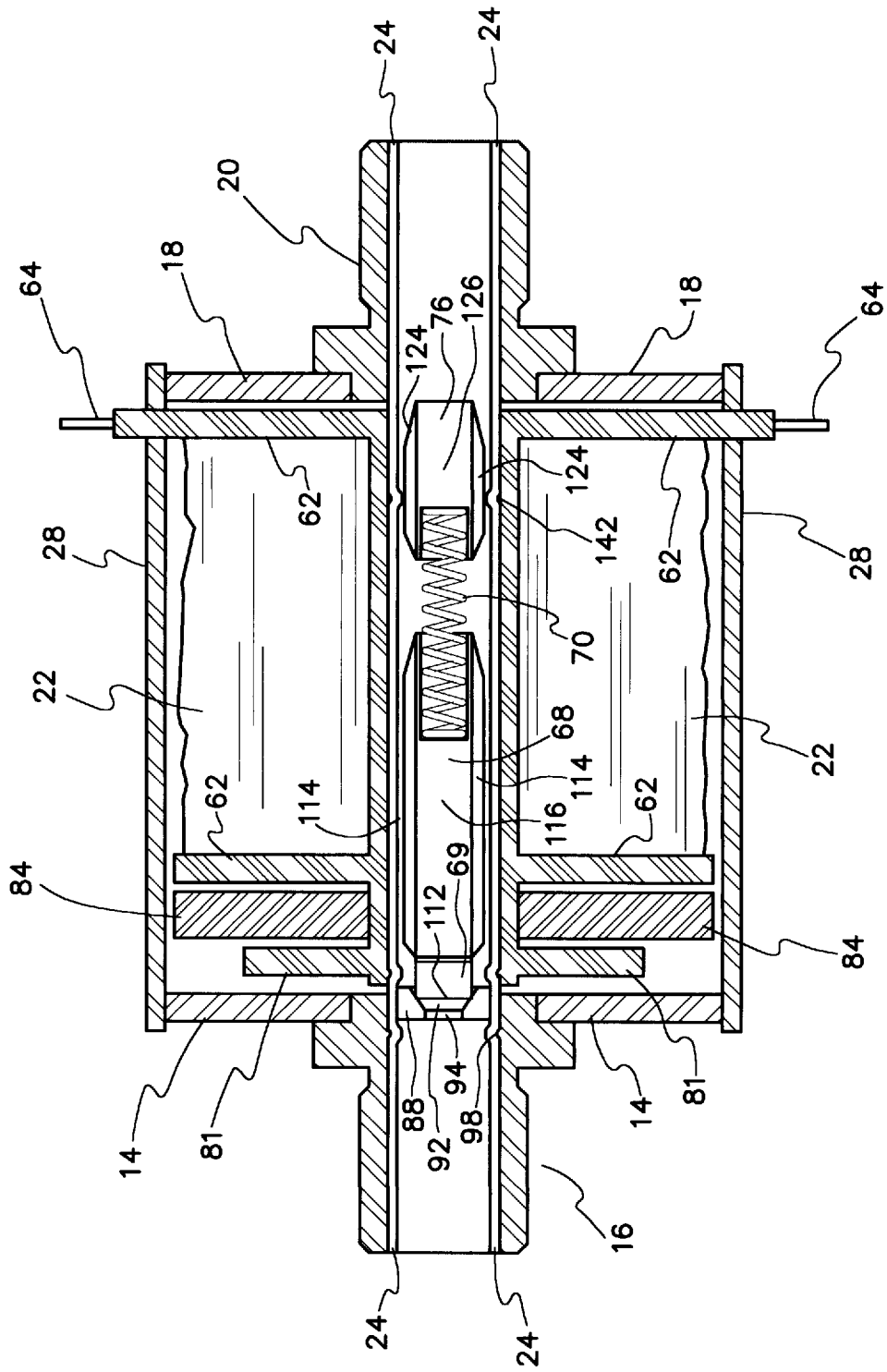
FIG. 5 is a cut-away view showing the interior of the solenoid valve of FIG. 2 in a de-energized state.
Figure 6:
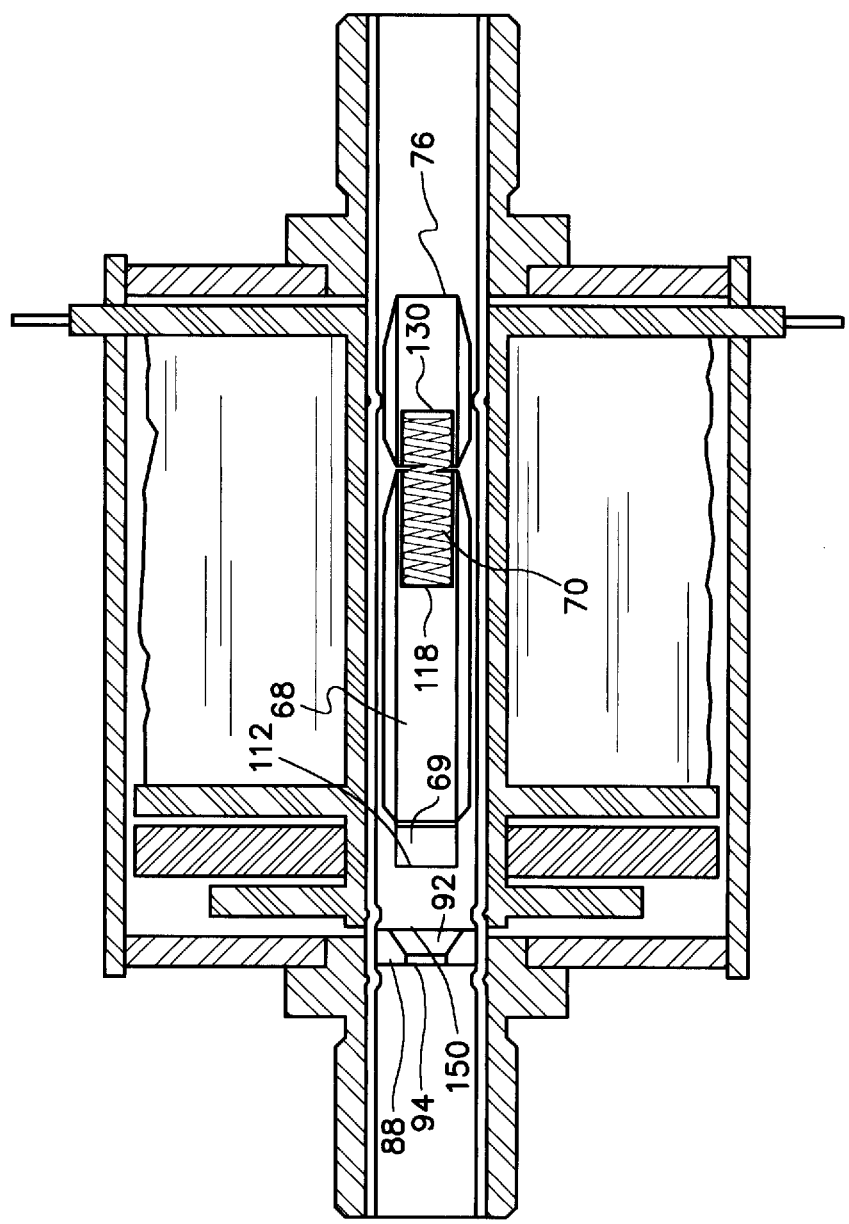
FIG. 6 is a cut-away view showing the interior of the solenoid valve of FIG. 2 in an energized state.

Referring now to FIG. 5, a cut-away view of the solenoid valve 10 of FIG. 2 in a de-energized, closed or "fail safe" position in accordance with this invention is depicted. In operation, the de-energized solenoid valve 10 has the spring 70 forcing the seal 69 against the seat 88. The sealing ridge 112 of the seal 69 requires less spring force to seal off flow and correspondingly requires less electrical power to overcome the force of the spring 70. When a fluid flow is required, a voltage is impressed across the coil assembly 22. The electrical current flowing through the coil 22 due to the impressed voltage, generates magnetic flux lines that are directed through the ferro-magnetic material of the plunger 68, flux washer 84, frame 12, front plate 18 and backstop 76. An attractive force is generated across the gap 150 (approximately 0.080 inches for the present invention which includes a three-eighth inch O.D. conduit 24 supplying 30,000 B.T.U.s per hour) formed between the plunger 68 and backstop 76 resulting in the plunger 68 being forcibly pulled against the backstop 76 thereby compressing the spring 70 (see FIG. 6). The energized position of the solenoid valve 10 allows a fluid flow stream to proceed between the inner wall 100 of the conduit 24 and the flow vanes 124 and arcuate grooves 126 of the backstop 76, and between the inner wall 100 and the flow vanes 114 and arcuate grooves 116 of the plunger 68. The vanes and tapered ends of the backstop 76 and plunger 68 maintain a substantially laminar fluid flow stream through the aperture 90 in the seat 88. The laminar flow results in a reduced backpressure at the seat and a correspondingly increased fluid flow rate through the aperture enabling the entire valve assembly to be designed smaller and at less cost for a required fluid flow rate.

When fluid flow is to stop or should the solenoid valve 10 fail during operation, the coil 22 is de-energized, the spring's 70 residual return force, developed by the plunger 68 being moved adjacent to the backstop 76, is strong enough to force the plunger 68 against the plunger receiving portion 92 of the seat 88 tight enough to stop fluid flow.

Obviously, many modifications and variations of the present invention are possible in light of the above teachings. Thus, it is to be understood that within the scope of the appended claims, the invention may be practiced otherwise than as specifically described above.

What is claimed and desired to be secured by Letters Patent of the United States is:

1. A Straight Fluid Flow Solenoid valve comprising:
   a substantially linear conduit having an inlet and outlet lineally aligned with an outlet of a source supplying a fluid flow;
   a seat having an aperture to allow a fluid flow to pass therethrough, said seat being secured to an inner wall portion in a first portion of said conduit,
   a backstop secured to an inner wall portion in a second portion of said conduit,
   said backstop including means for allowing a substantially laminar flowing fluid to pass adjacent thereto;
   a plunger positioned in said conduit between said seat and said backstop,
   said plunger including means for preventing a fluid flow through said seat aperture when first predetermined conditions are satisfied, and means for allowing a fluid flow to pass adjacent thereto when second predetermined conditions are satisfied;
   means for moving said plunger from a first position to a second position thereby forcibly engaging said plunger against said backstop to allow fluid flow through said aperture; and means for returning said plunger from said second position to said first position thereby forcibly engaging said plunger against said seat to prevent fluid flow through said seat aperture.

2. The straight fluid flow solenoid valve of claim 1, wherein said linear conduit is a cylindrically configured tube fabricated from nonferrous metal.

3. The straight fluid flow solenoid valve of claim 2, wherein said metal tube is fabricated from brass.

4. The straight fluid flow solenoid valve of claim 1, wherein said seat aperture includes means for receiving said plunger.

5. The straight fluid flow solenoid valve of claim 4, wherein said plunger receiving means includes a frustoconically configured plunger receiving portion.

6. The straight fluid flow solenoid valve of claim 1, wherein said means for allowing a fluid flow to pass adjacent to said backstop includes said backstop having substantially a square configuration when taking an end view of said backstop inserted in said conduit, said backstop having an arcuate recess in each longitudinal side thereby forming flow vanes corresponding to said substantially square configuration, said longitudinal side cooperatively positioned adjacent to an inner wall of said conduit to allow a fluid flow to be in communication with said backstop and said conduit.

7. The straight fluid flow solenoid valve of claim 1, wherein said fluid flow prevention means includes a seal secured to said plunger, said plunger being cooperatively engaged with a spring, said seal being cooperatively engaged with said seat, said spring providing a bias whereby said seal is urged against said seat thereby preventing fluid flow through said seat aperture.

8. The straight fluid flow solenoid valve of claim 1, wherein said fluid flow allowance means includes said plunger having a substantially square configuration when taking an end view of said plunger inserted in said conduit, said plunger having an arcuate recess in each longitudinal side forming flow vanes corresponding to said substantially square configuration, said longitudinal side cooperatively positioned adjacent to said inner wall of said conduit to allow said fluid flow to be in communication with said backstop and said conduit.

9. The straight fluid flow solenoid valve of claim 1, wherein said plunger movement means includes a coil circumferentially wound on a bobbin having an aperture therethrough to receive said conduit, said coil having a voltage impressed thereupon thereby generating a magnetic field, and means for directing said magnetic field such that said plunger is moved from said first position to said second position in cooperative engagement with said backstop.

10. The straight fluid flow solenoid valve of claim 1, wherein said plunger return means includes said spring being biased by said movement of said plunger from said first to said second position, and means for de-energizing said coil, said spring bias being sufficient to return said plunger from said second to said first position upon said coil being de-energized.

11. The straight fluid flow solenoid valve of claim 6, wherein said backstop includes tapered front and back end flow vane portions.

12. The straight fluid flow solenoid valve of claim 8, wherein said plunger includes tapered front end flow vane portions.

13. An on-off flow control valve having a substantially straight fluid flow passing therethrough, comprising:

a substantially linear enclosure having an inlet and outlet lineally aligned with an outlet of a source supplying a fluid flow to said enclosure;

a seat having an aperture to allow a fluid flow to pass therethrough said seat being secured to an inner wall portion in a first portion of said enclosure so that the directions of fluid flow entering said enclosure, passing through said aperture and exiting said enclosure are all substantially parallel;

a backstop secured to an inner wall portion in a second portion of said enclosure, said backstop including means for allowing a substantially laminar flowing fluid to pass adjacent thereto;

means for preventing a fluid flow through said enclosure when first predetermined conditions are satisfied.

14. A method for fabricating a solenoid valve having no internal fluid flow direction changes, comprising the steps of:

a. providing an enclosure having an inlet and outlet lineally aligned with an outlet of a source supplying a fluid flow to said enclosure;

b. providing a seat having an aperture to allow a fluid to pass therethrough, said seat being secured to an inner wall portion in a first portion of said enclosure;

c. providing a backstop secured to an inner wall portion in a second portion of said enclosure, said backstop including means for allowing a substantially laminar flowing fluid to pass adjacent thereto;

d. preventing a fluid flow through said enclosure when first predetermined conditions are satisfied; and e. allowing a fluid flow through said enclosure when second predetermined conditions are satisfied, said fluid flow through said enclosure remaining substantially linear between said inlet and said outlet.

* * * * *